# (12) United States Patent
Ishikawa et al.

(10) Patent No.: US 8,706,465 B2
(45) Date of Patent: Apr. 22, 2014

(54) SUPPORT SYSTEM ENABLING A DESIGN OF AN ELECTRONIC DEVICE INCLUDING AN INPUT DEVICE UTILIZING ELASTICITY AND METHOD THEREOF

(75) Inventors: Shigeo Ishikawa, Kawasaki (JP); Kanako Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 764 days.

(21) Appl. No.: 12/320,940

(22) Filed: Feb. 9, 2009

(65) Prior Publication Data

US 2009/0248382 A1  Oct. 1, 2009

(30) Foreign Application Priority Data

Mar. 31, 2008 (JP) .................. 2008-092973

(51) Int. Cl.
*G06F 17/50* (2006.01)

(52) U.S. Cl.
USPC .......................................................... 703/13

(58) Field of Classification Search
USPC .......................................................... 703/13
See application file for complete search history.

(56) References Cited

U.S. PATENT DOCUMENTS

| | | | | |
|---|---|---|---|---|
| 4,766,271 | A * | 8/1988 | Mitsuhashi et al. | 200/512 |
| 6,132,108 | A | 10/2000 | Kashiwamura et al. | |
| 2005/0033562 | A1* | 2/2005 | Narushima et al. | 703/2 |
| 2005/0080595 | A1* | 4/2005 | Huang | 702/183 |
| 2007/0067147 | A1* | 3/2007 | Huang | 703/7 |
| 2009/0164953 | A1* | 6/2009 | Kim | 716/2 |

FOREIGN PATENT DOCUMENTS

| | | |
|---|---|---|
| JP | 8-5479 | 1/1996 |
| JP | 10-207926 | 8/1998 |
| JP | 2003-173723 | 6/2003 |
| JP | 2006-268264 | 10/2006 |

OTHER PUBLICATIONS

John H. Lau et al., "Nonlinear analysis of elastomeric keyboard domes," 1989, Journal of Applied Mechanics, vol. 56, issue 4, pp. 751-755.*
EECO, "Elastomer Keypad Design Guidelines," Apr. 24, 2007, EECO, four pages.*
DongJae Shin, "Performance and Usability of Flexible Membrane Keyboards," 2005, Virginia Polytechnic Institute, pp. 1-72.*
Mark Nagurka et al., "Measurement of impedance characteristics of computer keyboard keys," 1999, Proceedings of the 7th Mediterranean Conference on Control and Automation, pp. 1940-1949.*
"ANSYS, Inc. Theory Reference", 2004, ANSYS, Inc., pp. 20-1 through 20-22.*

(Continued)

*Primary Examiner* — Dwin M Craig
*Assistant Examiner* — Russ Guill
(74) *Attorney, Agent, or Firm* — Staas & Halsey LLP (57) ABSTRACT

A design support system for supporting a design of an electronic device having an input device through which an input is made by utilizing elasticity is provided. The system includes a simulation unit for executing structural simulation of an input device based on structural data of the electronic device including the input device. The support system can include a re-design determining unit for notifying a need for re-design to a designer based on reactive characteristic data of the input device output from the simulation unit. The support system can include an examining unit for examining the reactive characteristic data, and a selecting unit for selecting another input device to replace the current input device.

9 Claims, 12 Drawing Sheets

(56) References Cited

OTHER PUBLICATIONS

John R. Mason, "Switch Engineering Handbook," 1993, McGraw-Hill, pp. 8-1 through 8-36.*

Tei Hirashima et al., "Development of Design System for Keyboard Rubber Diaphragms," 2002, Journal of the Society of Materials Science, vol. 51, No. 10, pp. 1141-1146.*

Japanese Office Action dated Feb. 21, 2012 issued in corresponding Japanese Patent Application No. 2008-092973.

* cited by examiner

REACTIVE FORCE IN SUPPORT
STRUCTURE HAVING LOW RIGIDITY

FIG. 12B

REACTIVE FORCE IN SUPPORT
STRUCTURE HAVING HIGH RIGIDITY

SUPPORT SYSTEM ENABLING A DESIGN OF AN ELECTRONIC DEVICE INCLUDING AN INPUT DEVICE UTILIZING ELASTICITY AND METHOD THEREOF

CROSS-REFERENCE TO RELATED APPLICATION(S)

This application is based upon and claims the benefit of priority from the prior Japanese Patent Application No. 2008-92973 filed on Mar. 31, 2008, the entire contents of which are incorporated herein by reference.

BACKGROUND

1. Field

The embodiments discussed herein are directed to a support system for a design.

2. Description of the Related Art

Light, thin, short and small designs have been promoted for portable electronic equipment, and a compact metal dome switch or a mechanical switch has been used as an input device. A reactive force, that is, a "click feeling" which a user can physically sense when the user pushes a switch mounted as an operating key in the portable electronic equipment is estimated when portable electronic equipment is designed.

Conventionally, a technique of converting to a digital signal an analog signal corresponding to a measurement result of reactive force occurring when a switch is pushed and displaying the digital signal has been disclosed.

SUMMARY

It is an aspect of the embodiments discussed herein to provide a design support system for supporting a design of an electronic device having an input device through which an input is made by utilizing elasticity.

The above aspects can be attained by a design support system for supporting a design of an electronic device having an input device through which an input is made by utilizing elasticity, comprising a simulation unit for executing a structural structure simulation of a the first input device on the basis of based on structural structure data of the electronic device having the first input device; a re-design determining unit for notifying re-design to a designer that based when it is determined on the basis of reactive characteristic data of the first input device output from the simulation unit that the electronic device is required to be re-designed; an examining unit for examining the reactive characteristic data; and a selecting unit for selecting a more proper second input device than the first input device from an input device data base when it is determined by the examining unit that the first input device is deficient.

The above aspects can be attained by a design support method of supporting the design of an electronic device having an input device through which an input is made by utilizing elasticity, including a simulation operation of executing a structural simulation of a first input device based on structural data of the electronic device including the first input device, a re-design determining operation of notifying a designer when it is determined based on reactive characteristic data of the first input device output from the simulation unit that the electronic device is required to be re-designed; an examining operation of examining the reactive characteristic data; and a selecting operation of selecting a second input device, to replace the first input device, from an input device data base when it is determined in the examining operation that the first input device is deficient These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

In an exemplary embodiment a cellular phone is used as an example of portable electronic equipment.

Figure 1:
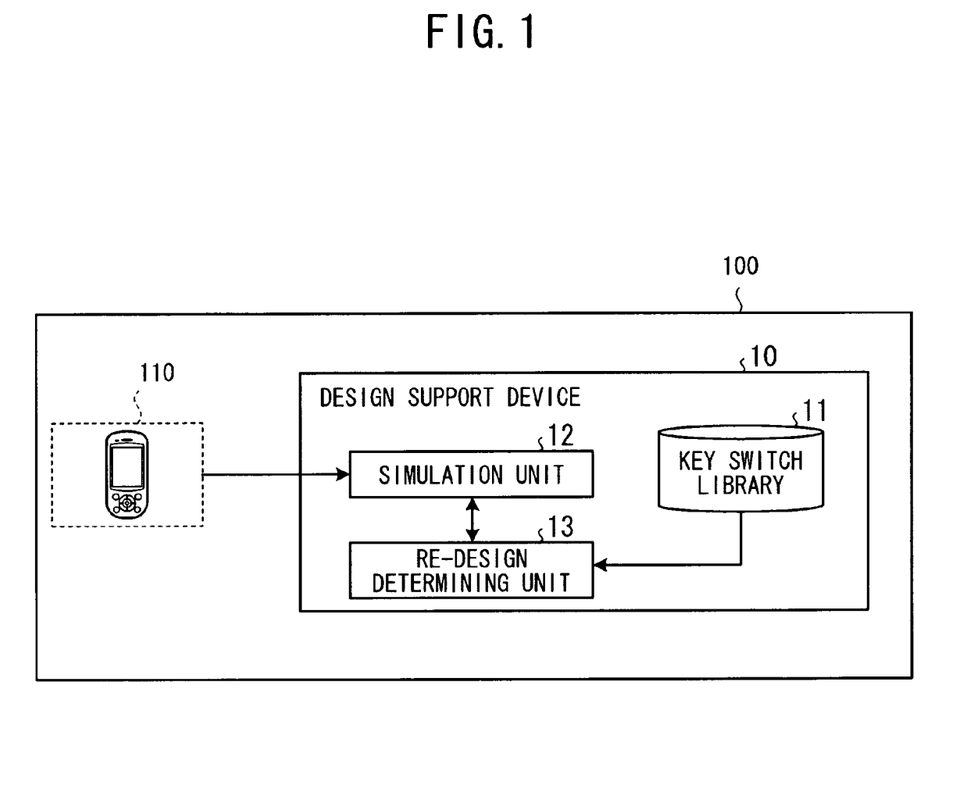
FIG. 1 illustrates a design support system according to an exemplary embodiment.

FIG. 1 illustrates an exemplary design support system 100 according to a first exemplary embodiment. As illustrated in FIG. 1, a design support system 100 includes a design support device 10 for executing structural simulation by using a key switch analysis model 110 includes a key switch library 11, a simulation unit 12 and a re-design determining unit 13.

The design support system according to the first exemplary embodiment executes a structural simulation of a key switch by using structural data of a cellular phone having the key switch to thereby obtain reactive force characteristic data of the key switch. When it is determined, based on the reactive force characteristic data concerned, that it is necessary to re-design the cellular phone, the requirements for the re-design are provided to a designer, and the previously obtained reactive force characteristic data is determined. If the key switch is determined to require a modification, alternate switch data can be selected from the key switch library.

The key switch library 11 records switch data of the key switch. For example, a maximum reactive force Fa, a weighted click rate CF, a maximum stroke La and a stroke click rate CS, etc. can be recorded as parameters used for the structural simulation. In addition, the key switch library 11 can record an estimation-completion flag indicating whether an estimation has been already made based on the structural simulation and a matching flag indicating that all conditions to be satisfied to optimize the click feeling of the key switch.

The maximum reactive force Fa, the weighted click rate CF, the maximum stroke La and the stroke click rate CS are further discussed with reference to FIG. 7.

The simulation unit 12 can execute a structural simulation on a key switch analysis model created by using the switch data of the key switch library, and transmits a structural simulation result containing Fa (maximum reactive force), Fb (weight drop from maximum reactive force), La (a stroke until the switch is turned on) and Lb (a stroke during the period when the weighted drop Fb from the maximum reactive force occurs) to a re-design determining unit 13.

When accepting the structural simulation result from the simulation unit 12, the re-design determining unit 13 can extract Fa (the maximum reactive force), Fb (the weighted drop from the maximum reactive force), La (the stroke until the switch is turned on) and Lb (the stroke during the period when the weighted drop Fb from the maximum reactive force occurs), and calculates the weighted click rate CF (=Fb/Fa) and the stroke click rate CS (=Lb/La).

The re-design determining unit 13 determines whether each of the calculated weighted click rate CF and the stroke click rate CS is within a preset proper range. If it is determined that the weighted click rate CF and the stroke click rate CS are not set within the preset proper ranges, a message of "design change required" is notified to a designer, and then the processing is stopped.

A weighted click rate CF can be determined to be outside of a desired range as a result of a rigidity of a key top provided on the key switch being excessively high. Accordingly, a designer can create a key switch analysis model in which the key top is changed, and execute the structural simulation again.

Furthermore, a stroke click rate CS can be determined to be out of the proper range because the synthesis of a support structure provided below the key switch is excessively lower. Accordingly, the designer creates a key switch analysis model in which the support structure is changed, and executes a structural simulation again.

When the weighted click rate CF and the stroke click rate CS are within the preset proper ranges, the re-design determining unit 13 subsequently determines whether the maximum reactive force Fa and the stroke La are within proper ranges.

If the maximum reactive force Fa and the stroke La are not within the proper ranges as a determination result, the re-design determining unit 13 can select new switch data from the key switch library, creates a key switch analysis model using the new switch data and executes the structural simulation again so that the maximum reactive force Fa and the stroke La fall within the proper ranges. When the new switch data are selected from the key switch library, an estimation-completion flag for the present switch data is set to ON.

On the other hand, when the maximum reactive force Fa and the stroke La are within the proper ranges, the re-design determining unit 13 turns on a matching flag of the key switch library 11 with respect to the corresponding switch data.

The re-design determining unit 13 executes the structural simulation until the estimation-completion flags or the matching flags for all the switch data are set to ON, and makes a determination on the simulation result.

When the determination on all the switch data is finished, the re-design determining unit 13 presents switch data whose matching flag is set to ON. At this time, when there exist plural switch data whose proper flags are set to ON, switch data having the smallest difference from an ideal reactive force characteristic calculated from equation (1) described later is presented as an optimum solution.

As described above, even when no real machine exists at the design initial stage of products, the processing of optimizing the click feeling of the key switch can be executed by the structural simulation. The foregoing is the summary of the design support system according to the first exemplary embodiment. The design support system according to the first exemplary embodiment will be described with reference to the accompanying drawings.

Figure 2:
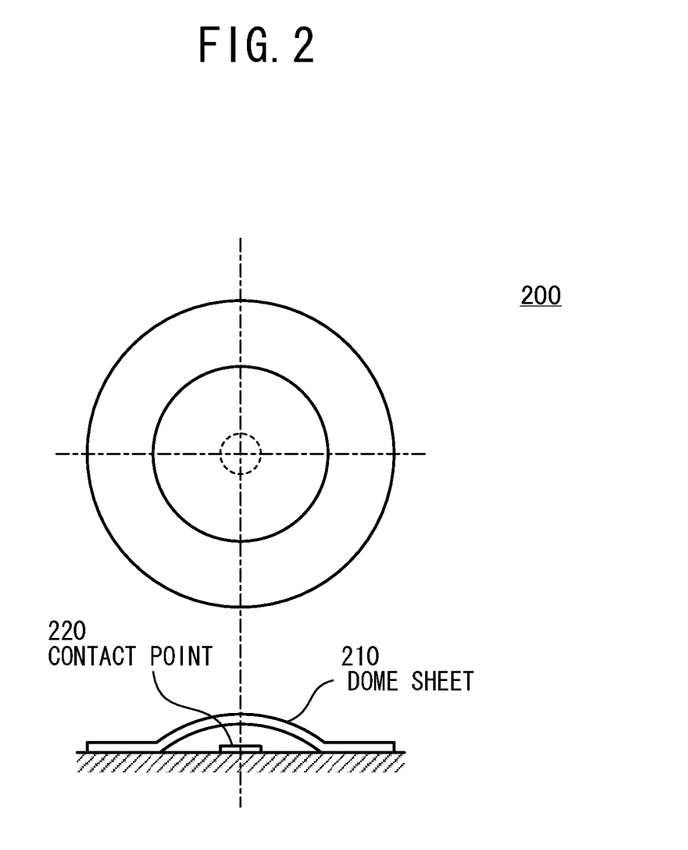
FIG. 2 illustrates an exemplary dome switch.
Figure 3:
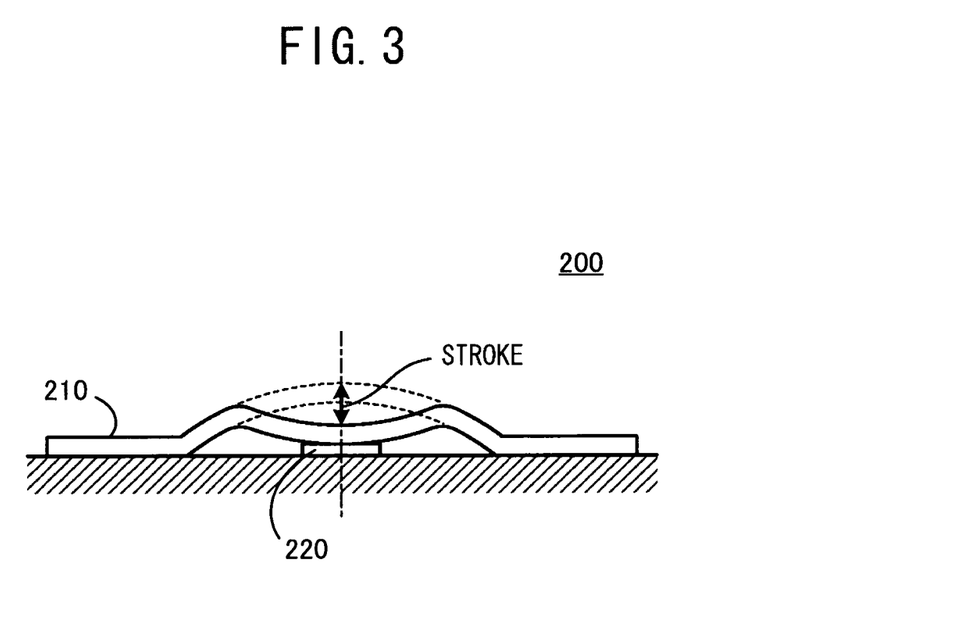
FIG. 3 illustrates an exemplary operation of a dome switch.

FIG. 2 illustrates an exemplary dome switch 200 including a dome sheet 210 and a contact point 220. FIG. 3 illustrates an exemplary operation of the dome switch 200. As illustrated in FIG. 2 and FIG. 3, when weight is applied to the dome switch 200 from the upper side thereof, the metal dome sheet 210 can be brought into contact with a contact point 220 and electrically connected to the contact point 220.

Figure 4:
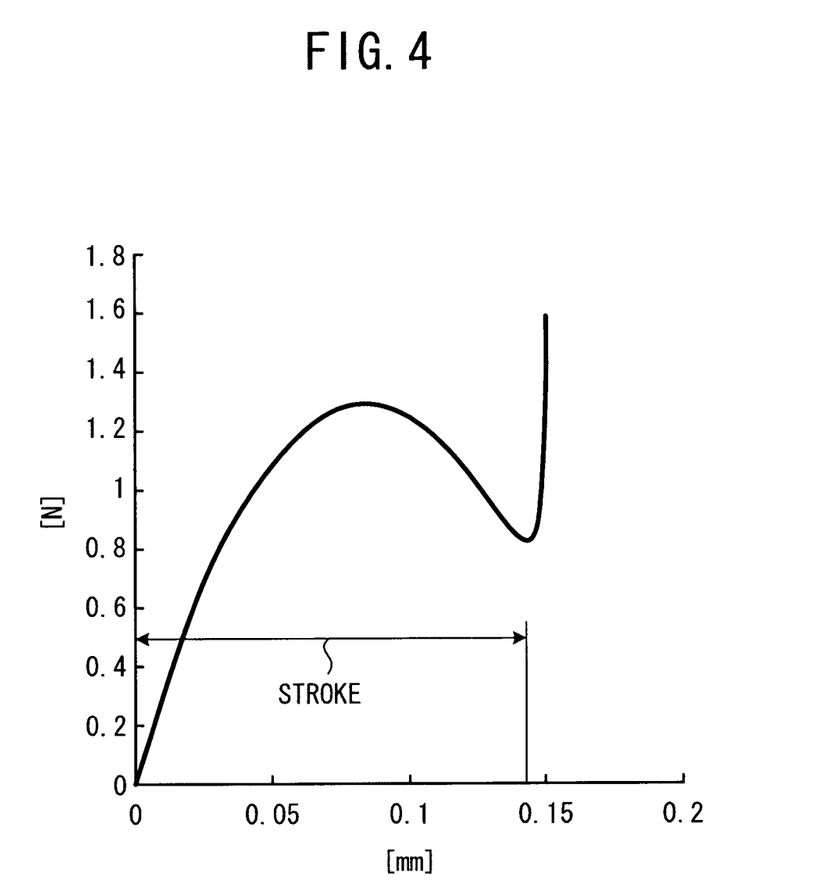
FIG. 4 illustrates an exemplary reactive force characteristic of a dome switch.

FIG. 4 illustrates an exemplary reactive characteristic of a dome switch. As the height of the dome sheet increases, the stroke (abscissa axis) becomes larger, and as the plate thickness of the dome sheet becomes larger, the reactive force (ordinate axis) is higher.

Figure 5:
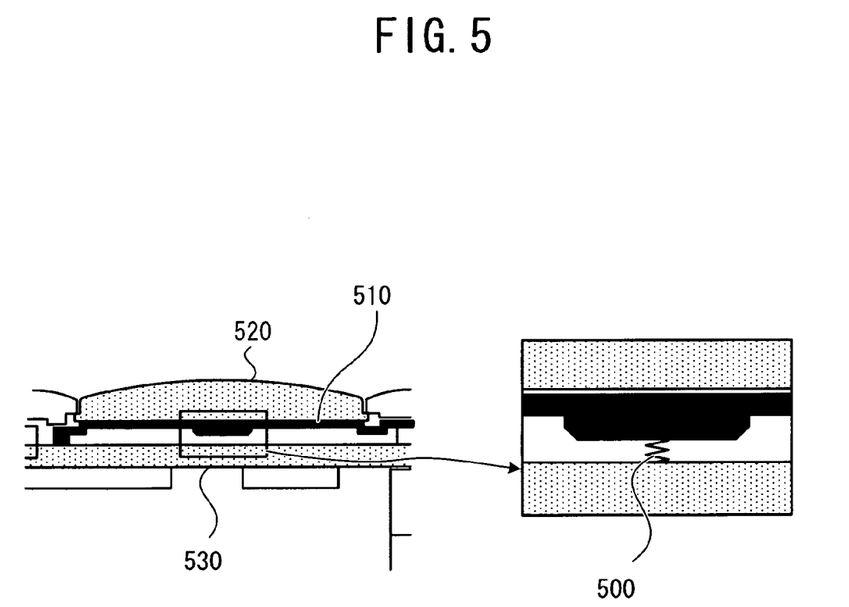
FIG. 5 illustrates an exemplary modeling of a key switch.

FIG. 5 is a diagram illustrating a modeled example of a key switch including a non-linear spring 500, a key sheet 510, a key 520, and a substrate 530. A non-linear spring 500 can be used in defining the reactive characteristic of the switch between the contact point position of the key sheet 510 and the substrate 530.

Figure 6:
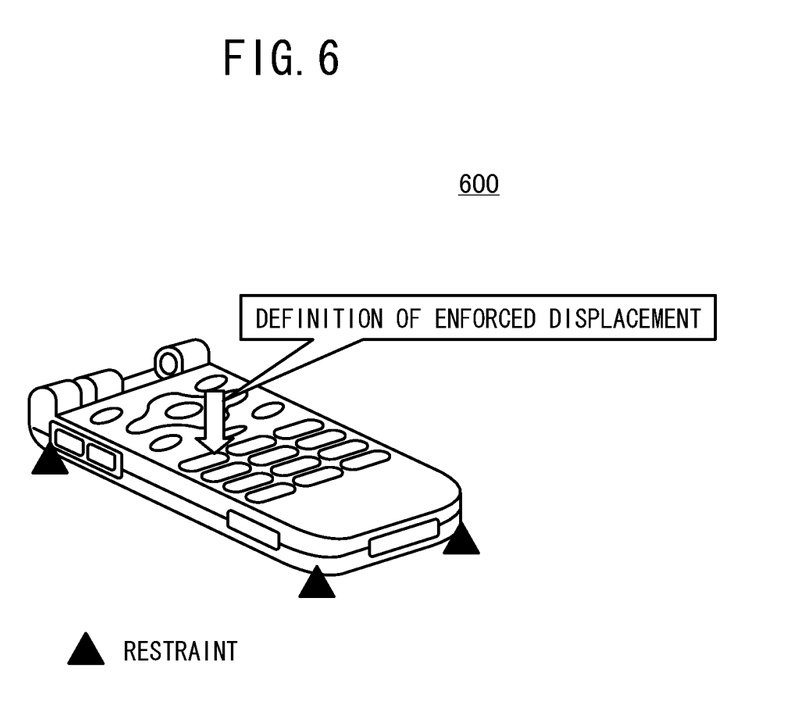
FIG. 6 illustrates an exemplary key switch analysis model.

FIG. 6 illustrates an exemplary key switch analysis model 600. In a numerical simulation using this key switch analysis model, the shape of a product, a material condition, a constraint condition and a weighting condition are given as parameters to determine the stress and the deformation amount of each part and the weight applied to each part. The numerical calculation method using the finite element method is general. An enforced displacement can be applied to the key top to calculate the reactive force, thereby estimating the click feeling when the key is pushed.

Figure 7:
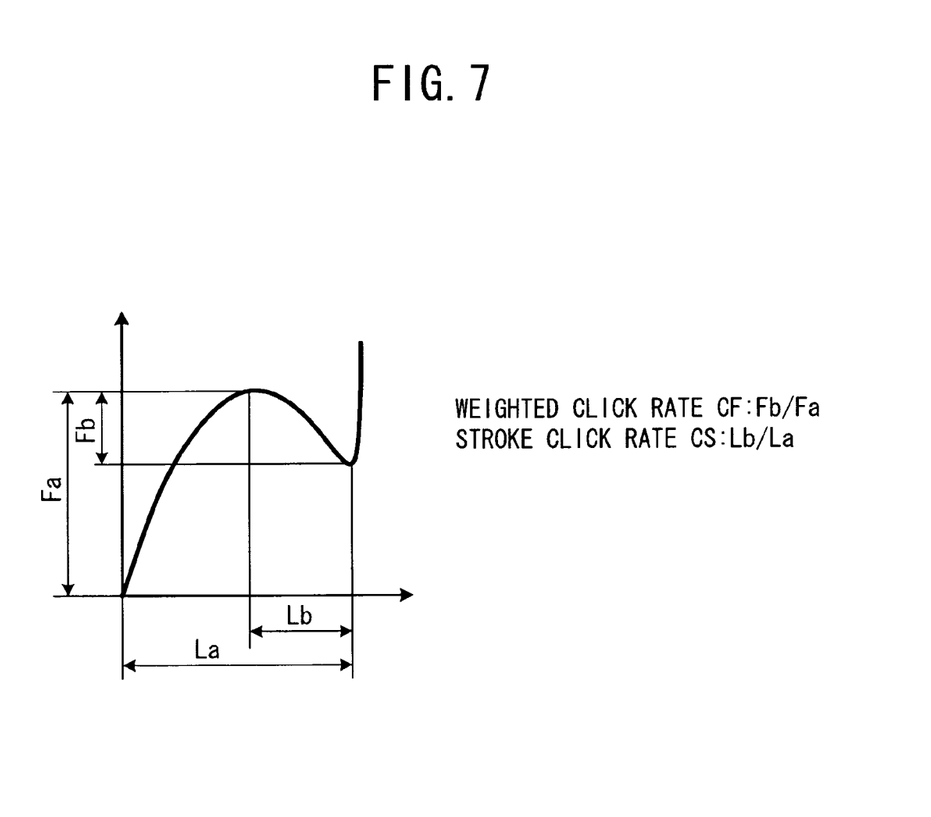
FIG. 7 illustrates an exemplary weighted click rate and a stroke click rate.

FIG. 7 illustrates an exemplary weighted click rate and the stroke click rate. With respect to a key switch such as a dome switch or the like, the weight is temporarily reduced by only Fb when the weight exceeds the maximum weight Fa in the key switch as illustrated in FIG. 7. This drop of the weight can be transmitted as a click feeling to a user, and assist the user to recognize that the user has pushed the key.

The weight drop Fb is divided by the maximum weight Fa, and the division result is defined as the weighted click rate CF. As the weighted click rate is larger, the user can more easily recognize they have pushed the key, and as the weighted click rate is smaller, it is difficult for the user to recognize that he/she has pushed the key.

Furthermore, the ratio between the stroke La until the switch is turned on and the stroke Lb during the period when the weight drop Fb occurs is defined as a stroke click rate CS. When the weighted click rate CS, as the stroke click rate is larger, the pushing of the key is more easily recognized. On the other hand, as the stroke click rate is smaller, it is difficult to recognize the pushing of the key.

Figure 8:
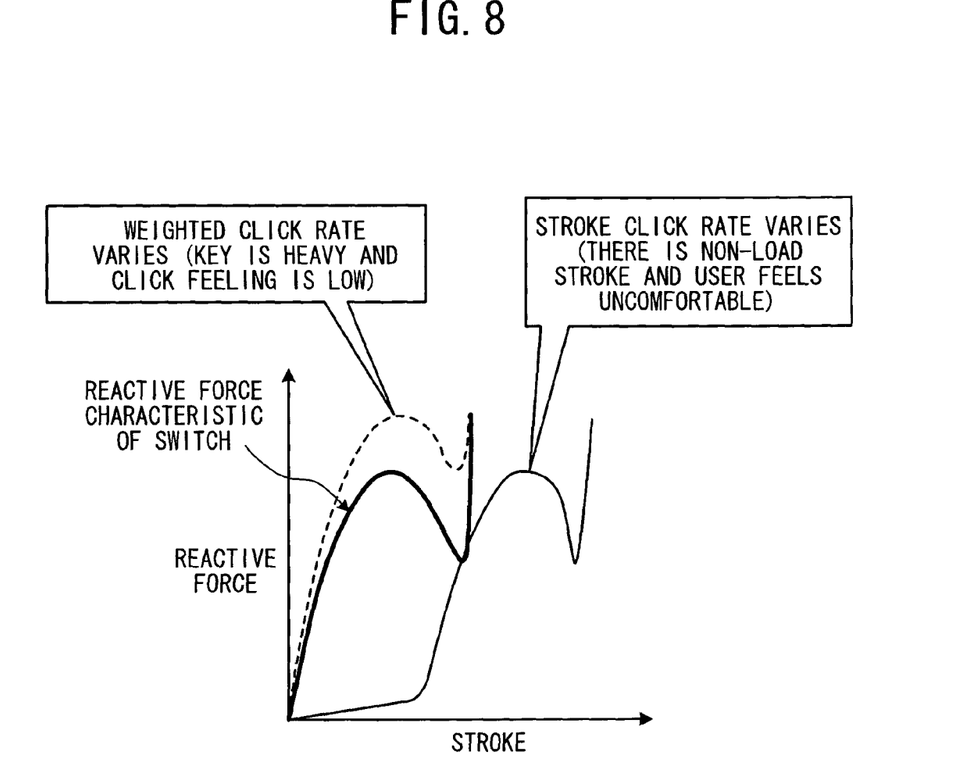
FIG. 8 illustrates an exemplary of the variation of a reactive force characteristic of the switch.

FIG. 8 illustrates a variation of the reactive characteristic of the switch. When the weighted click rate CF is lowered, the key is heavy, and the click rate is lowered. This occurs more frequently when the key top is hard and thus the switch cannot be smoothly pushed.

Furthermore, when the stroke click rate CS is lowered, the key sinks down with no load, and a section in which the switch is not turned on even when it is pushed is long. This can make the user have an uncomfortable feeling. This happens when the clearance in the device is large and the support structure of the board on which the switch is mounted is weak.

Figure 9:
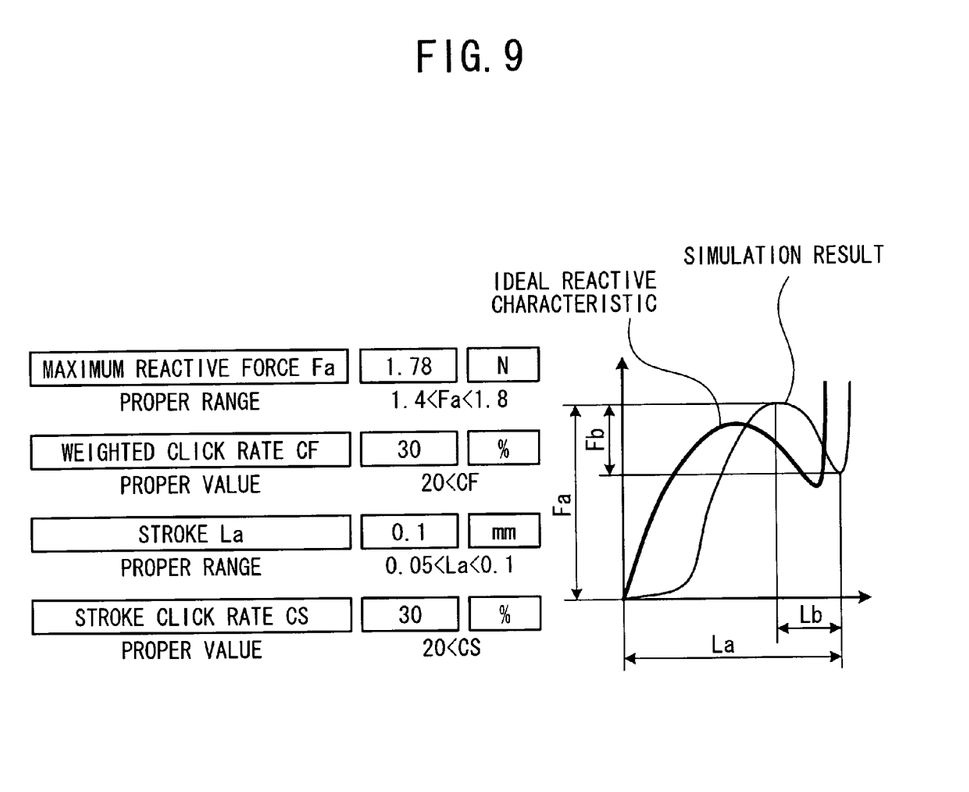
FIG. 9 illustrates an exemplary estimation result of a click feeling.

FIG. 9 illustrates an exemplary estimation result of the click feeling. As illustrated in FIG. 9, when the maximum reactive force Fa (the reaction to the maximum weight) is excessively small, the user has no click feeling. When the maximum reactive force Fa is excessively large, it is hard to push the key, and thus a proper range including a lower limit value and an upper limit value is set. Furthermore, with respect to the stroke La, when it is excessively small, the user has no click sense. However, when it is excessively large, it is hard to push the key, and thus a proper range including a lower limit value and an upper limit value is set.

Likewise, the weighted click rate CF and the stroke click rate are set to proper values. In the simulation, the design support system according to the first exemplary embodiment executes the click feeling optimizing processing of optimizing the weighted click rate CF, the stroke click rate, etc. so that the maximum reactive force Fa, the maximum stroke La, the weighted click rate CF and the stroke click rate converge in the proper ranges, that is, the ideal reactive force characteristic illustrated in the graph of the reactive force of FIG. 9 is established.

Figure 10:
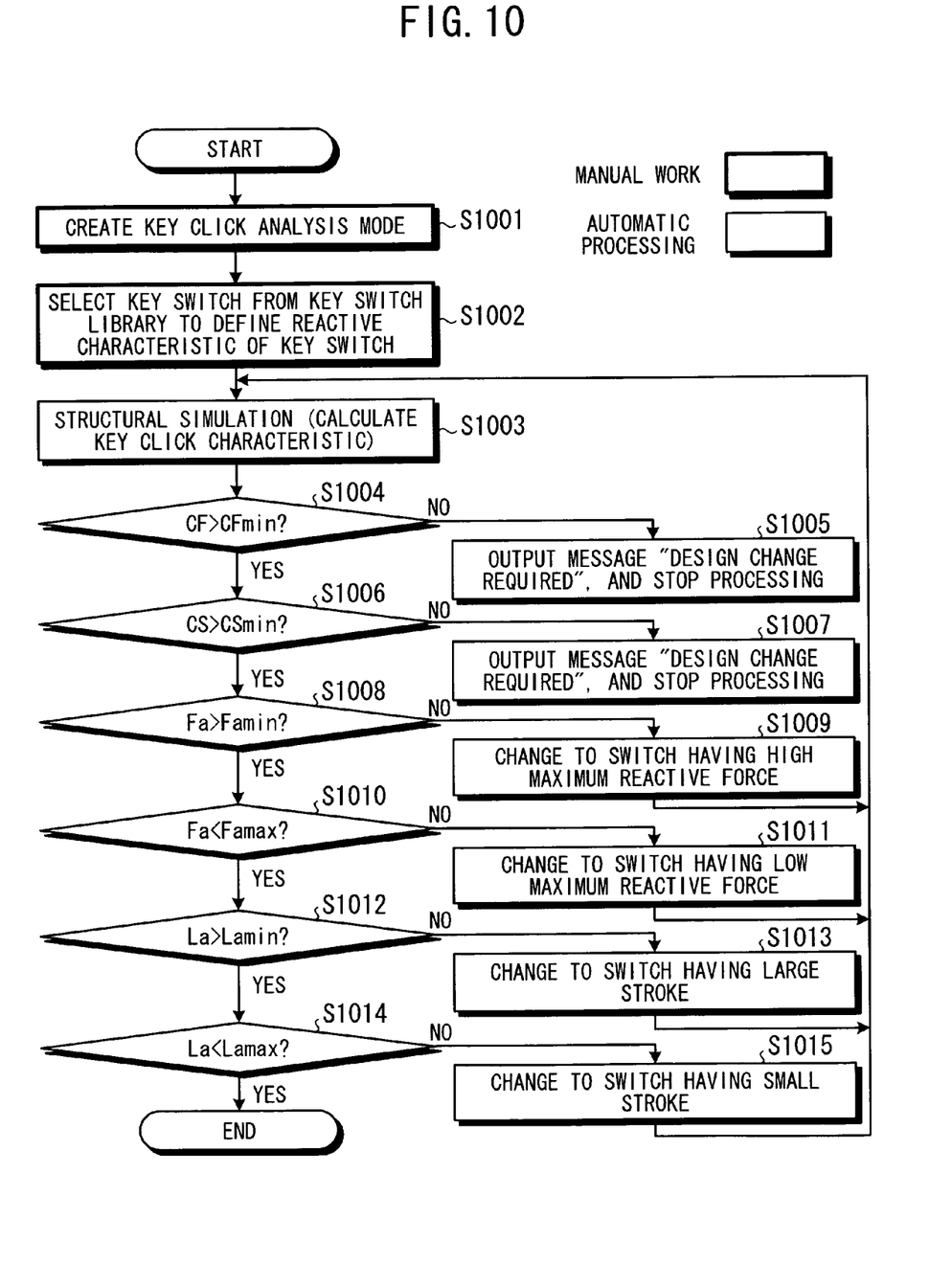
FIG. 10 illustrates an exemplary flow of click feeling optimization processing.

The design support system according to an exemplary embodiment is illustrated in FIG. 10. FIG. 10 illustrates an exemplary flow of a click feeling optimizing processing. As illustrated in FIG. 10, a key click analysis model (for example, see FIG. 6) is created (S1001), and then a key switch is selected from the key switch library to define a key switch reactive force characteristic (S1002).

The structural simulation is executed by using the key switch analysis model to which the selected key switch is applied (S1003). From the result of the structural simulation, the parameters Fa, Fb, La, Lb described with reference to FIG. 7 are extracted, the weighted click rate CF (=Fb/Fa) and the stroke click rate CS (=LB/La) are calculated, and it is determined whether the weighted click rate CF is equal to the minimum weighted click rate CFmin or more (S1004).

If it is determined that the weighted click rate CF is not equal to the minimum weighted click rate CFmin or more (S1004; No), this situation cannot be treated even by changing the key switch. Therefore, a message of "design change required" is output and the processing is stopped (S1005).

That is, the weighted click rate is lowered because the rigidity of the key top is excessively high with respect to the reactive characteristic of the key switch, and in such a case, the problem cannot be solved unless the structure of the key top is changed.

Figure 11A:
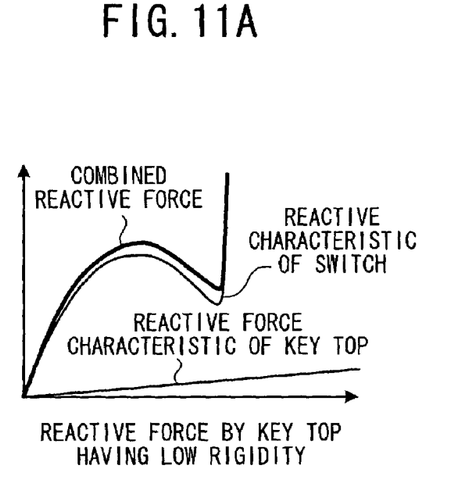
FIGS. 11A and 11B illustrates an exemplary effect of rigidity of a key top on the click characteristic.
Figure 11B:
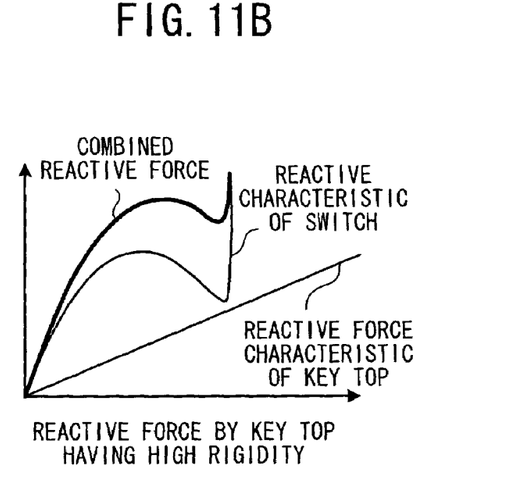

FIGS. 11A and 11B illustrate the effect of the rigidity of the key top on the click characteristic. As illustrated in FIG. 11A, when the rigidity of the key top is sufficiently low with respect to the reactive characteristic of the key switch, the click reactive force is slightly higher than the maximum reactive force of the characteristic of the switch, and thus the effect on the weighted click feeling is little.

On the other hand, when the rigidity of the key top is high as illustrated in FIG. 11B, the weighted click rate of the synthesized reactive force is reduced in proportion to the rigidity of the key top. In this case, it is impossible to improve the weighted click rate even when the key switch is changed, and thus it is necessary to change the design to reduce the rigidity of the key top.

Returning to the operation S1004, if it is determined that the weighted click rate CF is equal to the minimum weighted click rate CFmin or more (S1004; YES), it is determined whether the stroke click rate CL is equal to the minimum stroke click rate CLmin or more (S1006).

If it is determined that the stroke click rate CS is not above the minimum stroke click rate CSmin (S1006; NO), it cannot be treated by changing the key switch as when the weighted click rate CF is not equal to the minimum weighted click rate CFmin or less, and thus a message "design change required" is output, and the processing is stopped (S1007).

That is when the synthesis of the support structure of the key switch is excessively low, the stroke click rate is reduced. Therefore, it is necessary to change the design of the support structure of the key switch.

Figures 12A, 12B:
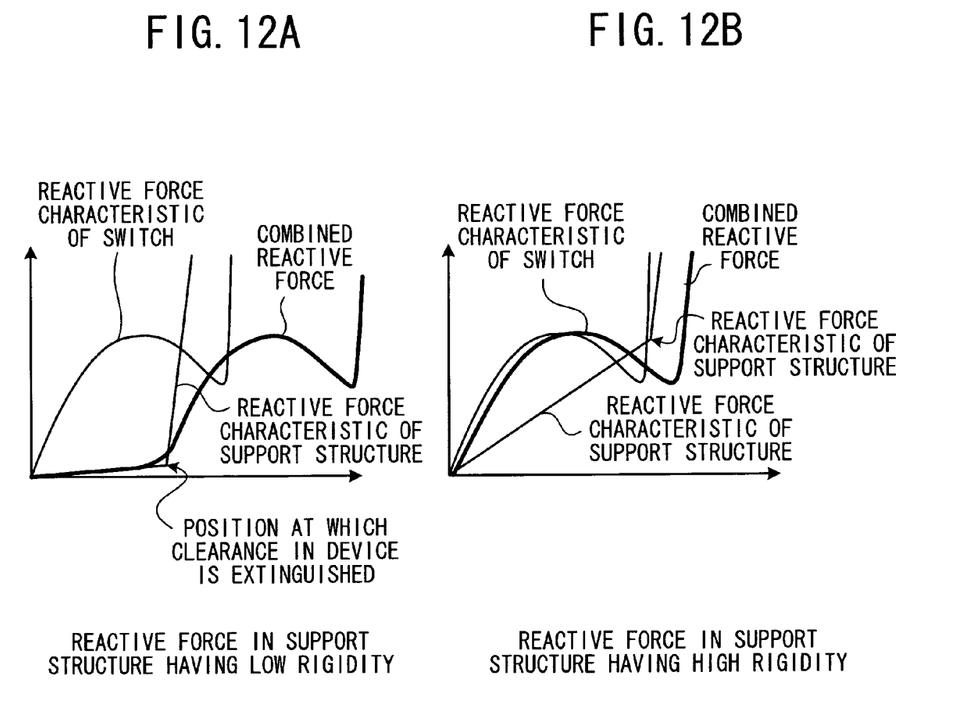
FIGS. 12A and 12B illustrates an exemplary effect of rigidity of a switch support structure on the click characteristic.

FIG. 12 illustrates an exemplary effect of the rigidity of the switch support structure on the click characteristic. As illustrated in FIG. 12A, when the rigidity of the switch support structure is low, the key switch is not operated until the clearance in the device is extinguished and the reactive force rapidly increases, so that the click stroke increases in proportion to the clearance of the inside of the device. Therefore, the stroke cannot be improved unless the rigidity of the support structure of the switch is increased or the clearance of the inside of the device is extinguished.

On the other hand, as illustrated in FIG. 12B, when the rigidity of the support structure of the switch is high, the stroke is slightly increased, however, the stroke can be improved by changing the switch.

Returning to the description of S1006, if the stroke click rate CS is equal to the minimum stroke click rate CSmin or more (S1006; Yes), it is determined whether the maximum reactive force Fa is equal to the minimum value (Fa min) or more (S1008).

If it is determined that the maximum reactive force Fa is not above the minimum value (Fa min) of the maximum reactive force (S1008; No), the switch is changed to a switch whose maximum reactive force is high (S1009), and the structure simulation is executed again (S1003). At this time, for example, the estimation-completion flag of the present switch data is set to ON in the key switch library, whereby it is prevented from being selected as a candidate in the next and subsequent determination operations.

Furthermore, when a new switch is selected, the maximum reactive force data of the switch is searched to select a switch whose maximum reactive force is nearest to the value obtained by adding the present maximum reactive force Fa with the difference between the ideal maximum reactive force ((Fa max)−(Fa min))/2 and the present maximum reactive force Fa.

Returning to the description of S1008, if the maximum reactive force Fa is equal to the minimum value (Fa min) of the maximum reactive force (S1008; Yes), it is determined whether the maximum reactive force Fa is equal to the maximum value (Fa max) of the maximum reactive force or less (S1010).

If it is determined that the maximum reactive Fa is equal to the maximum value (Fa max) of the maximum reactive force (S1010; No), the estimation-completion flag of the present switch data is set to ON, the switch is changed to a switch whose maximum reactive force is low (S1011), and the structure simulation is executed again (S1003).

Returning to the description of S1010, it is determined that the maximum reactive force Fa is equal to the maximum value (Fa max) of the maximum reactive force or less (S1010; Yes), it is determined whether the stroke La is equal to the minimum stroke (La min) or more (S1012).

If it is determined that the stroke La is not above the minimum stroke (La min) (S1012; No), the estimation-completion flag of the present switch data is set to ON, the switch is changed to a switch having a larger stroke (S1013), and then the structure simulation is executed again (S1003). At this time, the stroke data of the switch is searched to select a switch whose stroke is nearest to the value obtained by adding the present stroke La with the difference between the ideal stroke ((La max)−(La min))/2 and the present stroke La.

Returning to the description of S1012, if the stroke La is above the minimum stroke (La min) (S1012; Yes), it is determined whether the stroke La is below the maximum stroke (La max) (S1014).

If it is determined that the stroke La is not below the maximum stroke (La max) (S1014; No), the estimation-completion flag of the present switch data is set to ON, the switch is changed to a switch having a smaller stroke (S1015) and the structural simulation is executed again (S1013).

Returning to the description of S1014, it is determined that the stroke La is below the maximum stroke (La max) (S1014; Yes), all the conditions for optimizing the click feeling (S1004; Yes, S1006; Yes, S1008; Yes, S1010; Yes, S1012; Yes, S1014; Yes) are estimated to be satisfied, and thus the matching flag is set to ON as a matching switch in the key switch library.

The above processing can be repeated insofar as there exist any non-estimated data in the key switch library. When plural matching switches exist after all the data are estimated, a switch having the smallest difference from the ideal reactive force characteristic calculated according to the following equation (1) can be presented as a solution.

Difference from ideal reactive force characteristic=root of $((F_{ideal}-F_a)^2+(L_{ideal}-L_a)^2)$ Here, $F_{ideal}$(ideal maximum reactive force)=$(F_{max}-F_{min})/2$ $L_{ideal}$(ideal maximum stroke)=$(L_{max}-L_{min})/2$ When there is no switch satisfying all the conditions although all the switch data in the key switch library are estimated, a smaller one of the calculated weighted click rate and the calculated stroke click rate is regarded as a worse click rate, and the best worse click rate can be presented as a key switch.

According to a method and a recording medium according to a first exemplary embodiment, a click feeling of the operating key under the in-device mount state can be estimated at the design initial stage of portable electronic equipment, and occurrence of hand-return in product development can be prevented.

Furthermore, with respect to portable electronic equipment which is promoted as being light, thin, short and small in construction, customer satisfaction might be lost if the operability is sacrificed. That is, a click feeling of the key switch is an important factor for estimating the operability. On the other hand, according to the first exemplary embodiment, the click feeding can be quantitatively estimated, and furthermore a stable click feeling can be presented to customers regardless of the device by defining a desirable click characteristic.

The respective constituent elements of an exemplary design support device 10 illustrated in FIG. 1 can be considered as functional and conceptual, and they are not necessarily required to be physically arranged as illustrated in FIG. 1. That is, the specific style of the dispersion/integration of the respective constituent elements of the design support device 10 is not limited to the embodiment illustrated in FIG. 1. For example, all or some of the constituent elements may be functionally or physically dispersed/integrated in accordance with various kinds of load or use condition like a case where the simulation unit 12 and the re-design determining unit 13 are integrated with each other or the like. Furthermore, all or some of various processing functions (see FIG. 10, etc.) executed in the design support device 10 may be implemented with CPU and programs analyzed and executed by the CPU, or implemented by hardware based on wired logic.

According to an exemplary embodiment, a design support method can be encoded in a program and enable s a computer to execute simulation operation (for example, S1003 of FIG. 10) of executing a structural simulation of a first input device for executing an input inputting by utilizing elasticity based on structure data of an electronic device having the first input device. The method can include a re-design determination operation (for example, S1004 to S1007 of FIG. 10) of notifying a designer, based on reactive characteristic data of the first input device output from the simulation unit, that the electronic device having the first input device is required to be re-designed. The method can also include an examining operation (for example, S1008, S1010, S1012 and S1014 of FIG. 10) of examining the reactive force characteristic data and a selecting operation (for example, S1009, S1011, S1013 and S1015 of FIG. 10) of selecting a proper second input device from an input device data base when the first input device is determined to be improper based on the examination result of the examining operation.

According to an exemplary embodiment of a design support system and a design support method of the, the "click feeling" of the operating key in an in-device mounted t state can be estimated at the design initial stage of portable electronic equipment.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A design support system supporting a design of an electronic device having an input device through which an input is made by utilizing elasticity, comprising:
 a memory; and
 a processor coupled to the memory and configured to:
  execute a structural simulation of a first input device based on structural data of the electronic device having the first input device, said structural simulation includes a key switch analysis having a weighting condition as a parameter to calculate a reactive force of the first input device;

notify a designer, as a result of the structural simulation, that a re-design of the electronic device is required based on determination that reactive characteristic data of the first input device is outside a range to support the design of the electronic device;

examine the reactive characteristic data; and search an input device database and select a second input device when the first input device is deficient, where the second input device has parameters calculated to be reactive force nearest to an optimum value within the range from among other input devices.

2. The design support system according to claim 1, wherein the processor is configured to determine that the re-design of the electronic device is necessary when a weighted click rate and a stroke click rate of the first input device on the electronic device do not satisfy reference values.

3. The design support system according to claim 1, wherein the reactive characteristic data is examined based on maximum reactive force and a stroke amount of the first input device on the electronic device.

4. The design support system according to claim 3, wherein the second input device is selected as having maximum reactive force larger than the maximum reactive force of the first input device when the maximum reactive force of the first input device is smaller than a reference value.

5. The design support system according to claim 3, wherein the second input device is selected as having maximum reactive force smaller than the maximum reactive force of the first input device when the maximum reactive force of the first input device is larger than a reference value.

6. The design support system according to claim 3, wherein the second input device is selected as having a stroke amount larger than the stroke amount of the first input device when the stroke amount of the first input device is smaller than a reference value.

7. The design support system according to claim 3, wherein the second input device is selected as having a stroke amount smaller than the stroke amount of the first input device when the stroke amount of the first input device is larger than a reference value.

8. The design support system according to claim 1, wherein any input device which has been already selected is not re-selected, and the second input device is applied to the structural data of the electronic device so that structural simulation is executed based on the structural data concerned.

9. A design support method of supporting the design of an electronic device having an input device through which an input is made by utilizing elasticity, comprising:

executing a structural simulation of a first input device based on structural data of the electronic device including the first input device, said structural simulation includes a key switch analysis having a weighting condition as a parameter to calculate a reactive force of the first input device;

notifying a designer, as a result of the structural simulation, that a re-design of the electronic device is required based on determination that reactive characteristic data of the first input device is outside a range to support the design of the electronic device;

examining the reactive characteristic data; and searching an input device database and selecting a second input device, to replace the first input device, when the first input device is deficient, where the second input device has parameters calculated to be reactive force nearest to an optimum value within the range from among other input devices.

* * * * *